US008092946B2

(12) United States Patent
Kawase

(10) Patent No.: US 8,092,946 B2
(45) Date of Patent: Jan. 10, 2012

(54) FUEL CELL SYSTEM AND CONTROL METHOD OF THE SYSTEM

(75) Inventor: Ayako Kawase, Gamou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 83 days.

(21) Appl. No.: 12/811,860

(22) PCT Filed: Jan. 14, 2009

(86) PCT No.: PCT/JP2009/050362
§ 371 (c)(1),
(2), (4) Date: Jul. 7, 2010

(87) PCT Pub. No.: WO2009/096223
PCT Pub. Date: Aug. 6, 2009

(65) Prior Publication Data
US 2010/0279192 A1 Nov. 4, 2010

(30) Foreign Application Priority Data

Jan. 30, 2008 (JP) .................................. 2008-019702

(51) Int. Cl.
*H01M 8/04* (2006.01)
(52) U.S. Cl. ........ 429/429; 429/408; 429/427; 429/430; 429/431; 429/432; 429/443; 429/446; 429/448; 429/449
(58) Field of Classification Search .................. 429/408, 429/427, 428, 429, 430, 431, 432, 443, 446, 429/448, 449
See application file for complete search history.

(56) References Cited

U.S. PATENT DOCUMENTS
2006/0210849 A1 9/2006 Bono

FOREIGN PATENT DOCUMENTS
| JP | 10-284102 A | 10/1998 |
|---|---|---|
| JP | 2002-216818 A | 8/2002 |
| JP | 2003-36871 A | 2/2003 |
| JP | 2003-303605 A | 10/2003 |
| JP | 2005-174855 A | 6/2005 |
| JP | 2005-267969 A | 9/2005 |
| JP | 2006-19153 A | 1/2006 |
| JP | 2006-92948 A | 4/2006 |
| JP | 2006-202696 A | 8/2006 |
| JP | 2006-294295 A | 10/2006 |
| JP | 2007-265676 A | 10/2007 |

*Primary Examiner* — Patrick Ryan
*Assistant Examiner* — Ben Lewis
(74) *Attorney, Agent, or Firm* — Kenyon & Kenyon LLP

(57) ABSTRACT

Disclosed is a fuel cell system capable of stabilizing the power generation state of a fuel cell for a period of transition from a power generation stop state during an intermittent operation or the like to a usual operation. The fuel cell system supplies a fuel gas from a fuel supply source to a fuel cell to generate a power, and comprises output limit means for limiting the output of the fuel cell after shift from the power generation stop state of the fuel cell to a power generation state. The output limit means subtracts the flow rate of the fuel gas used to recover the pressure of the fuel gas in the power generation stop state to the pressure of the fuel gas in the power generation state from the total flow rate of the fuel gas supplied from the fuel supply source after the shift from the power generation stop state to the power generation state, to calculate the flow rate of the fuel gas actually supplied to the fuel cell after the shift from the power generation stop state to the power generation state, thereby limiting the output of the fuel cell by use of an output current value corresponding to the calculated flow rate as an upper limit.

2 Claims, 4 Drawing Sheets

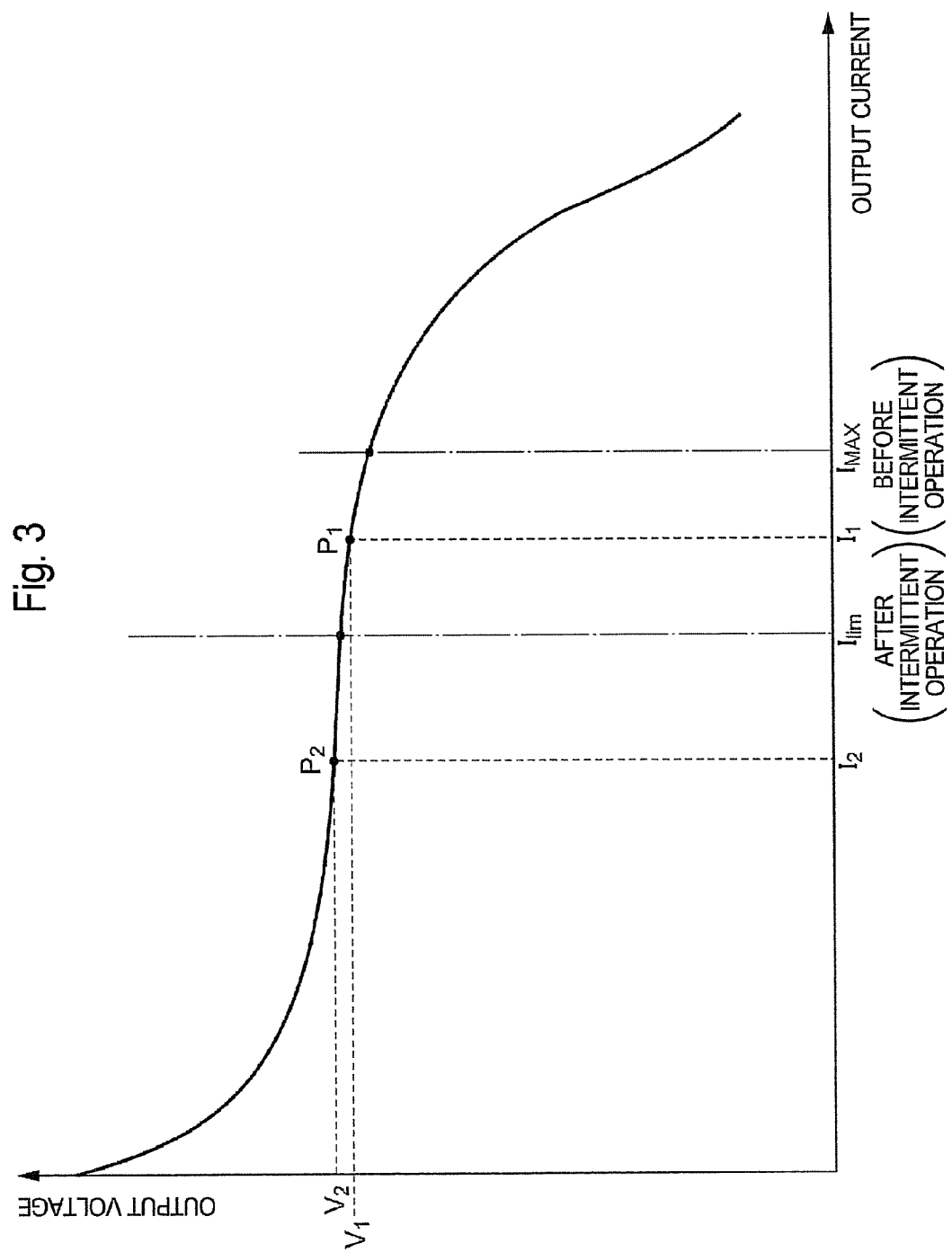

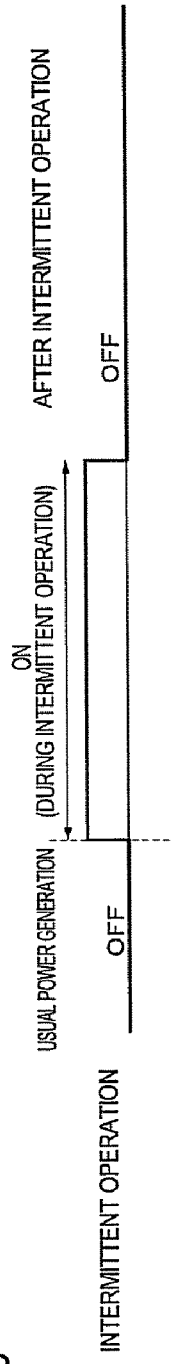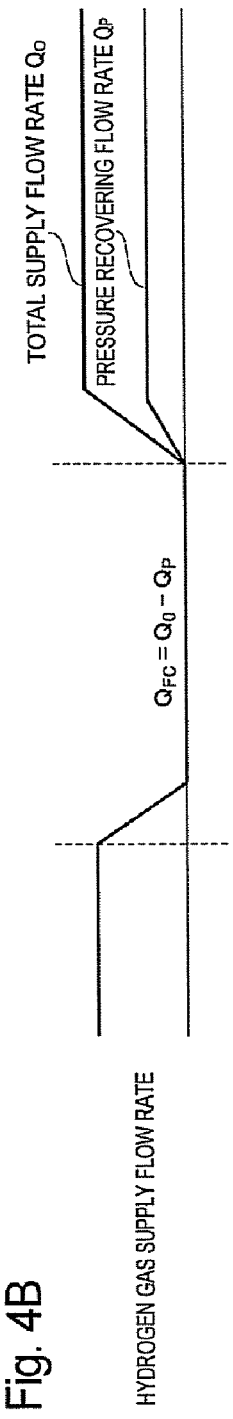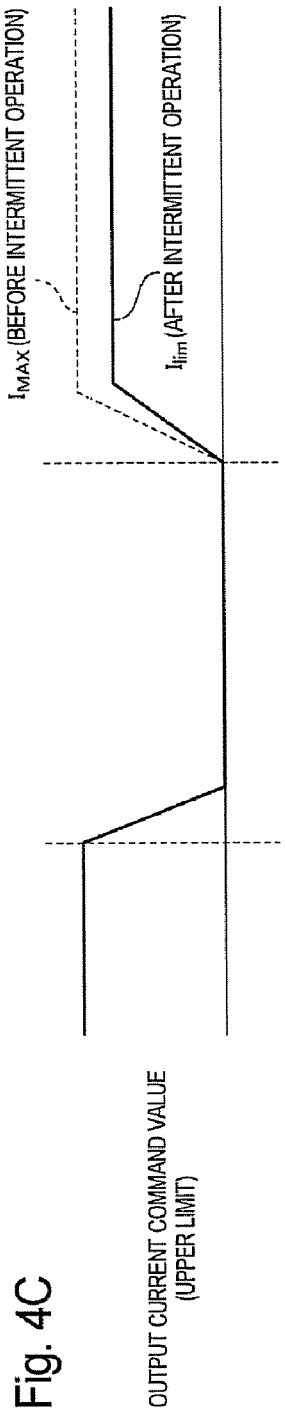

100
FUEL CELL SYSTEM AND CONTROL METHOD OF THE SYSTEM

This is a 371 national phase application of PCT/JP2009/050362 filed 14 Jan. 2009, which claims priority to Japanese Patent Application No. 2008-019702 filed 30 Jan. 2008, the contents of which are incorporated herein by reference.

TECHNICAL FIELD

The present invention relates to a fuel cell system and a control method of the system.

BACKGROUND ART

Heretofore, a fuel cell system has been put to practical use, the system including a fuel cell which receives a supplied reactant gas (a fuel gas and an oxidizing gas) to generate a power. Moreover, at present, there is suggested a fuel cell system including a secondary cell such as a storage cell in addition to the fuel cell. The system performs an operation (an intermittent operation) for temporarily stopping the power generation of the fuel cell in case of a low load or the like, and returns to a usual, operation to restart the power generation in case of a load increase or the like (e.g., see Patent Document 1).

Patent Document 1: Japanese Patent Application Laid-Open No. 2003-303605

DISCLOSURE OF THE INVENTION

Problem to be Solved by the Invention

Meanwhile, during an intermittent operation for temporarily stopping the power generation of a fuel cell, the supply of a fuel gas to the fuel cell is blocked, and hence a gas pressure in a fuel supply passage for supplying the fuel gas from a fuel supply source to the fuel cell becomes lower than a gas pressure during a usual operation.

Therefore, in a case where immediate acceleration is attempted to be performed from the intermittent operation by use of a conventional technology disclosed in Patent Document 1, even when the supply flow rate of the fuel gas from the fuel supply source is increased, a situation could occur in which the fuel gas is not sufficiently supplied to the fuel cell itself until the gas pressure in the fuel supply passage recovers to the gas pressure during the usual operation. If such a situation occurs, a stoichiometric ratio after return from the intermittent operation to the usual operation decreases, and the stability of the power generation state of the fuel cell might not be secured.

The present invention has been developed in view of such a situation, and an object thereof is to provide a fuel cell system capable of stabilizing the power generation state of a fuel cell for a period of transition from a power generation stop state during an intermittent operation or the like to a usual operation.

Means for Solving the Problem

To achieve the above object, a fuel cell system according to the present invention is a fuel cell system which comprises a fuel supply source and a fuel cell and which supplies a fuel gas from the fuel supply source to the fuel cell to generate a power, the fuel cell system further comprising output limit means for limiting the output of the fuel cell after shift from the power generation stop state of the fuel cell to a power generation state, wherein the output limit means subtracts the flow rate of the fuel gas used to recover the pressure of the fuel gas in the power generation stop state to the pressure of the fuel gas in the power generation state from the total flow rate of the fuel gas supplied from the fuel supply source after the shift from the power generation stop state to the power generation state, to calculate the flow rate of the fuel gas actually supplied to the fuel cell after the shift from the power generation stop state to the power generation state, thereby limiting the output of the fuel cell by use of an output current value corresponding to the calculated flow rate as an upper limit.

Moreover, a control method of a fuel cell system according to the present invention is a control method of a fuel cell system which comprises a fuel supply source and a fuel cell and which supplies a fuel gas from the fuel supply source to the fuel cell to generate a power and which limits the output of the fuel cell after shift from the power generation stop state of the fuel cell to a power generation state thereof, the method comprising a flow rate calculation step of subtracting the flow rate of the fuel gas used to recover the pressure of the fuel gas in the power generation stop state to the pressure of the fuel gas in the power generation state from the total flow rate of the fuel gas supplied from the fuel supply source after the shift from the power generation stop state to the power generation state, to calculate the flow rate of the fuel gas actually supplied to the fuel cell after the shift from the power generation stop state to the power generation state; and an output limit step of limiting the output of the fuel cell by use of an output current value corresponding to the flow rate calculated in the flow rate calculation step as an upper limit.

When these constitution and method are employed, the flow rate used to recover the gas pressure is subtracted from the total supply flow rate of the fuel gas after the shift from the power generation stop state to the power generation state to calculate the flow rate of the gas actually supplied to the fuel cell, whereby the output of the fuel cell can be limited by using the output current value corresponding to the calculated flow rate as the upper limit. Therefore, the gas consumption in the fuel cell after the shift from the power generation stop state to the power generation state can be limited to suppress the decrease of the stoichiometric ratio, and hence the power generation state of the fuel cell can be stabilized.

It is to be noted that "the power generation stop state" means a state in which the power generation by the fuel cell is stopped (e.g., an operation stop mode to completely stop the operation of the fuel cell, or an intermittent operation mode to temporarily stop the power generation of the fuel cell in case of a low load or the like), and "the power generation state" means a state in which the fuel cell continuously generates the power (a usual operation mode). Moreover, "the stoichiometric ratio" means the surplus ratio of the amount of the gas to be supplied to the fuel cell with respect to the gas consumption of the fuel cell.

Effect of the Invention

According to the present invention, it is possible to provide a fuel cell system capable of stabilizing the power generation state of a fuel cell for a period of transition from a power generation stop state during an intermittent operation or the like to a usual operation.

BEST MODE FOR CARRYING OUT THE INVENTION

Hereinafter, a fuel cell system 1 according to an embodiment of the present invention will be described with reference to the drawings. In the present embodiment, there will be described an example in which the present invention is applied to a car-mounted power generation system of a fuel cell vehicle.

First, a constitution of the fuel cell system 1 according to the embodiment of the present invention will be described with reference to FIG. 1.

As shown in FIG. 1, the fuel cell system 1 according to the present embodiment includes a fuel cell 2 which receives a supplied reactant gas (a fuel gas and an oxidizing gas) to generate a power; an oxidizing gas piping system 3 which supplies air as the oxidizing gas to the fuel cell 2; a fuel gas piping system 4 which supplies a hydrogen gas as the fuel gas to the fuel cell 2; a power system 5 which charges or discharges the power of the system; a control device 6 which generally controls the whole system and the like.

The fuel cell 2 is made of, for example, a solid polymer electrolyte type, and includes a stack structure in which a large number of unitary cells are stacked. Each of the unitary cells of the fuel cell 2 has a cathode pole (an air pole) on one face of an electrolyte made of an ion exchange membrane, and an anode pole (a fuel pole) on the other face thereof, and the cell further has a pair of separators so as to sandwich the cathode pole and the anode pole from both sides. The fuel gas is supplied to a fuel gas passage of one separator, and the oxidizing gas is supplied to an oxidizing gas passage of the other separator, whereby the fuel cell 2 receives the supplied gas to generate a power. The fuel cell 2 is provided with a current sensor 2a and a voltage sensor 2b for detecting a current and a voltage (an output current and an output voltage) during the power generation. It is to be noted that as the fuel cell 2, instead of the solid polymer electrolyte type, a phosphoric acid type, a molten carbonate type or another type may be employed.

The oxidizing gas piping system 3 has an air compressor 31, an oxidizing gas supply path 32, a humidifying module 33, a cathode off gas passage 34, a diluter 35, a motor M1 which drives the air compressor 31 and the like.

The air compressor 31 is driven by the driving force of the motor M1 which operates in accordance with the control command of the control device 6 to supply oxygen (the oxidizing gas) taken from outside air through an air filter (not shown) to the cathode'pole of the fuel cell 2. The oxidizing gas supply path 32 is a gas passage for guiding oxygen supplied from the air compressor 31 to the cathode pole of the fuel cell 2. A cathode off gas is discharged from the cathode pole of the fuel cell 2. The cathode off gas contains water generated by the cell reaction of the fuel cell 2, and hence has a highly wet state.

The humidifying module 33 performs water exchange between the oxidizing gas flowing through the oxidizing gas supply path 32 and having a lowly wet state and the cathode off gas flowing through the cathode off gas passage 34 and having the highly wet state, to appropriately humidify the oxidizing gas to be supplied to the fuel cell 2. The cathode off gas passage 34 is a gas passage for discharging the cathode off gas externally from the system, and an air pressure regulation valve A1 is disposed near the outlet of the cathode pole of the gas passage. The back pressure of the oxidizing gas supplied to the fuel cell 2 is regulated by the air pressure regulation valve A1. The diluter 35 dilutes the hydrogen gas so that the discharge concentration of the hydrogen gas falls within a preset concentration range (the range determined based on an environmental standard or the like). The diluter 35 communicates with the downstream side of the cathode off gas passage 34 and the downstream side of an anode off gas passage 44 described later, and a hydrogen off gas and an oxygen off gas are mixed, diluted and discharged externally from the system.

The fuel gas piping system 4 has a fuel supply source 41, a fuel gas supply path 42, a fuel gas circulation path 43, the anode off gas passage 44, a hydrogen circulation pump 45, a check valve 46, a motor M2 for driving the hydrogen circulation pump 45 and the like.

The fuel supply source 41 is means for supplying a fuel gas such as the hydrogen gas to the fuel cell 2, and is made of, for example, a high pressure hydrogen tank, a hydrogen storage tank or the like. The fuel gas supply path 42 is a gas passage for guiding the fuel gas discharged from the fuel supply source 41 to the anode pole of the fuel cell 2, and the gas passage is provided with valves such as a tank valve H1, a hydrogen supply valve H2 and an FC inlet valve H3 arranged from the upstream side to the downstream side. The tank valve H1, the hydrogen supply valve H2 and the FC inlet valve H3 are shut valves for supplying (or shutting) the fuel gas to the fuel cell 2, and are made of, for example, electromagnetic valves.

The fuel gas circulation path 43 is a return gas passage for the reflow of an unreacted fuel gas to the fuel cell 2, and the gas passage is provided with an FC outlet valve H4, the hydrogen circulation pump 45, and the check valve 46 arranged from the upstream side to the downstream side. The low pressure unreacted fuel gas discharged from the fuel cell 2 is appropriately pressurized by the hydrogen circulation pump 45 driven by the driving force of the motor M2 which operates in accordance with the control command of the control device 6, and the gas is guided to the fuel gas supply path 42. The counterflow of the fuel gas from the fuel gas supply path 42 to the fuel gas circulation path 43 is suppressed by the check valve 46. The anode off gas passage 44 is a gas passage for discharging an anode off gas including the hydrogen off gas discharged from the fuel cell 2 externally from the system, and the gas passage is provided with a purge valve H5.

The power system 5 includes a high voltage DC/DC converter 51, a battery 52, a traction inverter 53, an auxiliary inverter 54, a traction motor M3, auxiliary motors M4 and the like.

The high voltage DC/DC converter 51 is a direct-current voltage converter, and has a function of regulating a direct-current voltage supplied from the battery 52 to output the voltage to the traction inverter 53 and a function of regulating a direct-current voltage input from the fuel cell 2 or the traction motor M3 to output the voltage to the battery 52. The charging/discharging of the battery 52 is realized by these functions of the high voltage DC/DC converter 51. Moreover, the output voltage of the fuel cell 2 is controlled by the high voltage DC/DC converter 51.

The battery 52 is a chargeable/dischargeable secondary cell, and is made of any type of secondary cell (e.g., a nickel hydrogen battery or the like). The battery 52 can be controlled by a battery computer (not shown) to charge a surplus power or auxiliarily supply the power. The pressure of a part of the direct-current power generated by the fuel cell 2 is raised or lowered by the high voltage DC/DC converter 51, and the power is charged into the battery 52. It is to be noted that instead of the battery 52, a chargeable/dischargeable accumulator (e.g., a capacitor) other than the secondary cell may be employed.

The traction inverter 53 and the auxiliary inverter 54 are PWM inverters of a pulse width modulation system, and in accordance with a given control command, the inverters convert the direct-current power output from the fuel cell 2 or the battery 52 into a three-phase alternate-current power to supply the powers to the traction motor M3 and the auxiliary motors M4. The traction motor M3 is a motor for driving wheels 7L, 7R. The traction motor M3 is provided with a rotation number detection sensor 5a which detects the rotation number of the motor. The auxiliary motors M4 are motors for driving various types of auxiliary devices, and generically include the motor M1 for driving the air compressor 31, the motor M2 for driving the hydrogen circulation pump 45 and the like.

The control device 6 is constituted of a CPU, an ROM, an RAM and the like, and generally controls the parts of the system based on input sensor signals. Specifically, the control device 6 calculates the output demand power of the fuel cell 2 based on the sensor signals sent from the rotation number detection sensor 5a, an acceleration pedal sensor 6a for detecting the open degree of an acceleration pedal and the like. Moreover, the control device 6 controls the output voltage and output current of the fuel cell 2 so as to generate an output power corresponding to the output demand power. Furthermore, the control device 6 controls the output pulse widths of the traction inverter 53 and the auxiliary inverter 54 and the like to control the traction motor M3 and the auxiliary motors M4.

Moreover, the control device 6 switches a usual operation mode and an intermittent operation mode. The usual operation mode is an operation mode in which the fuel cell 2 continuously generates the power in order to supply the power to a load device such as the traction motor M3. The intermittent operation mode is an operation mode in which during a low load operation such as idling, low speed running or regenerative braking, the power generation of the fuel cell 2 is temporarily halted, the power is supplied from the battery 52 to the load device, and the hydrogen gas and air are intermittently supplied to the fuel cell 2 to such an extent that an open end voltage can be kept. The usual operation mode corresponds to the power generation state in the present invention, and the intermittent operation mode corresponds to the power generation stop state in the present invention.

Furthermore, the control device 6 controls the output of the fuel cell 2 after the return (shift) of the operation mode of the fuel cell 2 from the intermittent operation mode to the usual operation mode. Specifically, the control device 6 subtracts the flow rate of the hydrogen gas used to recover the pressure of the hydrogen gas in the intermittent operation mode to the pressure of the hydrogen gas in the usual operation mode from the total flow rate of the hydrogen gas supplied from the fuel supply source 41 after the return from the intermittent operation mode to the usual operation mode, to calculate the flow rate of the hydrogen gas actually supplied to the fuel cell 2 after the return from the intermittent operation mode to the usual operation mode. Moreover, the control device 6 limits the output of the fuel cell 2 by use of the output current value corresponding to the calculated flow rate as the upper limit. That is, the control device 6 functions as output limit means in the present invention.

Next, a control method of the fuel cell system 1 according to the present embodiment will be described with reference to a flow chart of FIG. 2, a map of FIG. 3 and time charts of FIGS. 4A to 4C.

First, the control device 6 performs control for realizing the usual operation mode after startup (a usual operation control step: S1). In the usual operation control step S1, the control device 6 calculates the output demand power of the fuel cell 2 based on the sensor signals sent from the rotation number detection sensor 5a, the acceleration pedal sensor 6a and the like, to calculate the output current command value and output voltage command value corresponding to the calculated output demand power. For example, the control device 6 calculates an output current command value $I_1$ and an output voltage command value $V_1$ based on the IV characteristic map shown in FIG. 3 and a calculated output demand power $P_1$. Then, the control device 6 performs control for regulating the amount of the gas to be supplied to the fuel cell 2 by use of various valves and the air compressor 31 to bring the output current of the fuel cell 2 detected by the current sensor 2a close to the output current command value $I_1$. Moreover, the control device 6 performs control so as to bring the output voltage of the fuel cell 2 detected by the voltage sensor 2b close to the output voltage command value $V_1$ by use of the high voltage DC/DC converter 51. It is to be noted that in the present embodiment, the upper limit of the output current command value before entrance to the intermittent operation mode is $I_{MAX}$.

Subsequently, the control device 6 judges whether or not conditions (operation switch conditions) for switching the operation mode of the fuel cell 2 from the usual operation mode to the intermittent operation mode are satisfied (an intermittent operation start judgment step: S2). As the operation switch conditions, for example, a condition that the change of a demand power or power generation with an elapse of time is less than a predetermined threshold value may be employed. Then, on judging that the operation switch conditions are satisfied in the intermittent operation start judgment step S2, the control device 6 switches the operation mode of the fuel cell 2 from the usual operation mode to the intermittent operation mode (an intermittent operation control step: S3). In the intermittent operation control step S3, the control device 6 temporarily stops the power generation of the fuel cell 2, supplies the power from the battery 52 to the load device, and intermittently supplies the hydrogen gas and air to the fuel cell 2 to such an extent that the open end voltage can be kept.

Next, the control device 6 judges whether or not an intermittent operation time has elapsed (an intermittent operation end judgment step: S4). In a case where it is judged that the intermittent operation time has elapsed, the control device ends the intermittent operation mode, and returns to the usual operation mode (a usual operation restart step: S5).

However, when the intermittent operation mode is realized to temporarily stop the power generation of the fuel cell 2, the supply of the hydrogen gas to the fuel cell 2 is shut, so that the pressure of the hydrogen gas in the fuel gas supply passage 42 for supplying the hydrogen gas from the fuel supply source 41 to the fuel cell 2 becomes lower than the pressure in the usual operation mode. In consequence, during the return from the intermittent operation mode to the usual operation mode, the control device 6 recovers the pressure of the hydrogen gas in the fuel gas supply passage 42 to a value in the usual operation mode, and limits the output of the fuel cell 2 (an output limit step: S6).

In the output limit step S6, as shown in FIGS. 4A and 4B, the control device 6 subtracts a pressure recovering flow rate $Q_p$ used to recover the pressure of the hydrogen gas from a total supply flow rate $Q_O$ of the hydrogen gas after the return from the intermittent operation mode to the usual operation mode, to calculate a flow rate $Q_{FC}$ of the hydrogen gas actually supplied to the fuel cell 2. Then, the control device 6 limits the output of the fuel cell 2 by use of an output current value $I_{lim}$ corresponding to the calculated flow rate $Q_{FC}$ as the upper limit of the output current command value. As shown in FIGS. 3 and 4C, the output current value $I_{lim}$ corresponding to the flow rate $Q_{FC}$ of the hydrogen gas actually supplied to the fuel cell 2 after the return from the intermittent operation mode to the usual operation mode becomes a value smaller than an upper limit $I_{MAX}$ of the output current command value before the entrance to the intermittent operation mode.

In the output limit step S6, the control device 6 calculates an output current command value $I_2$ ($<I_{lim}$) and an output voltage command value $V_2$ based on, for example, an output demand power $P_2$ and the IV characteristic map shown in FIG. 3. Then, the control device 6 regulates the amount of the air to be supplied to the fuel cell 2 by use of the valves and the air compressor 31, thereby performing control for bringing the output current of the fuel cell 2 detected by the current sensor 2a close to the output current command value $I_2$. Moreover, the control device 6 performs control for bringing the output voltage of the fuel cell 2 detected by the voltage sensor 2b close to the output voltage command value $V_2$, by use of the high voltage DC/DC converter 51. The output limit step S6 in the present embodiment includes a flow rate calculation step and an output limit step in the present invention.

In the fuel cell system 1 according to the above-mentioned embodiment, the flow rate (the pressure recovering flow rate) used to recover the gas pressure is subtracted from the total supply flow rate of the hydrogen gas after the return from the intermittent operation mode to the usual operation mode, to calculate the flow rate actually supplied to the fuel cell 2, whereby the output of the fuel cell 2 can be limited by using the output current value corresponding to the calculated flow rate as the upper limit. Therefore, the decrease of a stoichiometric ratio after the return from the intermittent operation mode to the usual operation mode can be suppressed to stabilize the power generation state of the fuel cell 2.

It is to be noted that in the above embodiment, there has been described an example in which the present invention is applied for a period of transition from the intermittent operation mode for temporarily stopping the power generation of the fuel cell 2 in case of a low load or the like to the usual operation mode, but the present invention may be applied for a period of transition from an operation stop mode (the power generation stop state) for completely stopping the operation of the fuel cell 2 to the usual operation mode.

INDUSTRIAL APPLICABILITY

As described above in an embodiment, a fuel cell system according to the present invention can be mounted on a fuel cell vehicle, and can be mounted even on various mobile bodies (a robot, a ship, an airplane, etc.) other than the fuel cell vehicle. Moreover, the fuel cell system according to the present invention may be applied to a stational power generation system used as a power generation facility for a construction (a housing, a building or the like).

BRIEF DESCRIPTION OF THE DRAWINGS

FIG. 3 is an IV characteristic map of the fuel cell system shown in FIG. 1;
FIG. 4A is a time chart showing ON/OFF of the intermittent operation mode of the fuel cell system shown in FIG. 1;
FIG. 4B is a time chart showing the history of the supply flow rate of a hydrogen gas in the fuel cell system shown in FIG. 1 with an elapse of time;
and
FIG. 4C is a time chart showing the history of an output current command value (an upper limit) in the fuel cell system shown in FIG. 1 with an elapse of time.

DESCRIPTION OF REFERENCE NUMERALS

Figure 1:
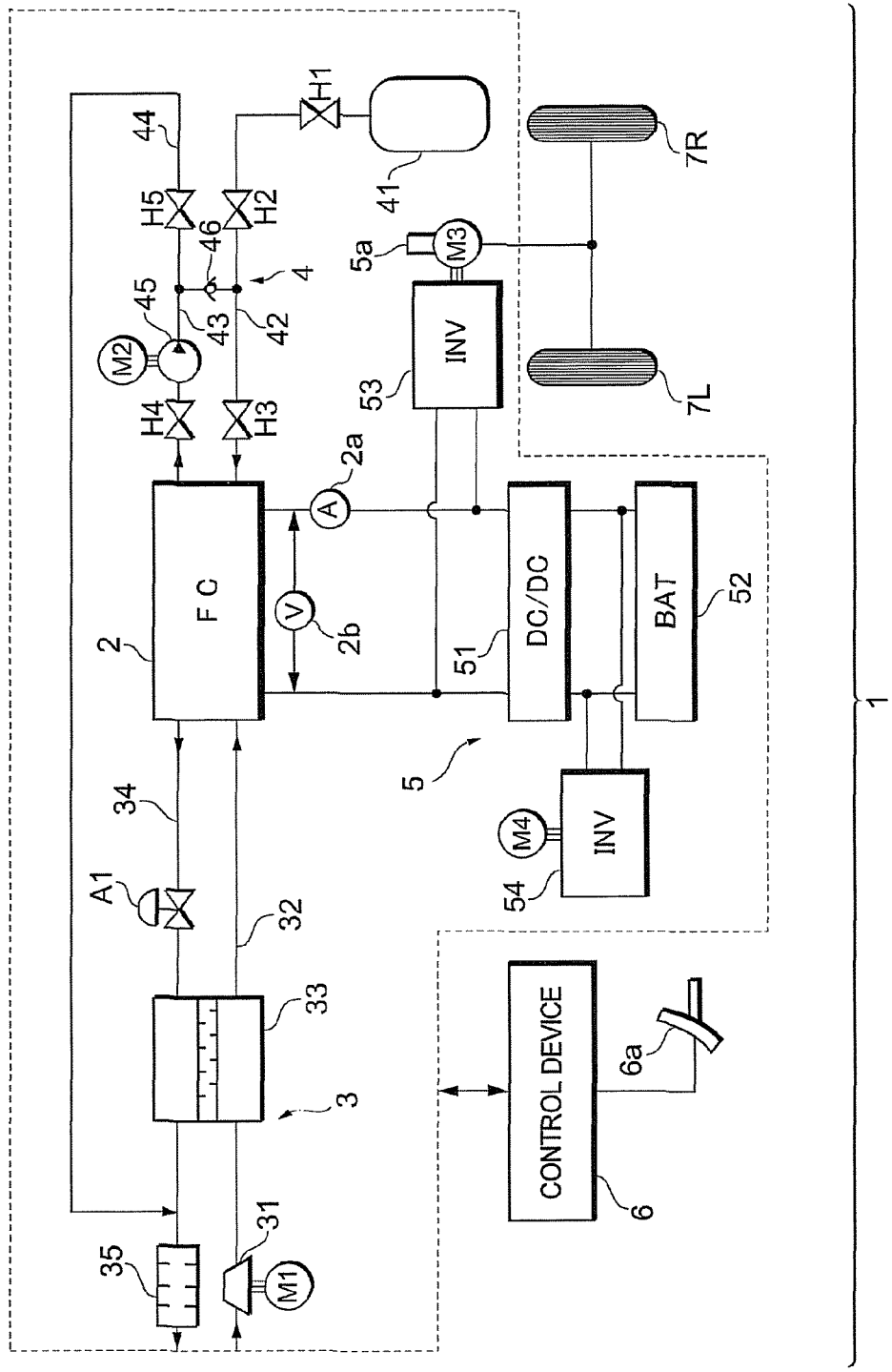
FIG. 1 is a constitution diagram of a fuel cell system according to an embodiment of the present invention.
Figure 2:
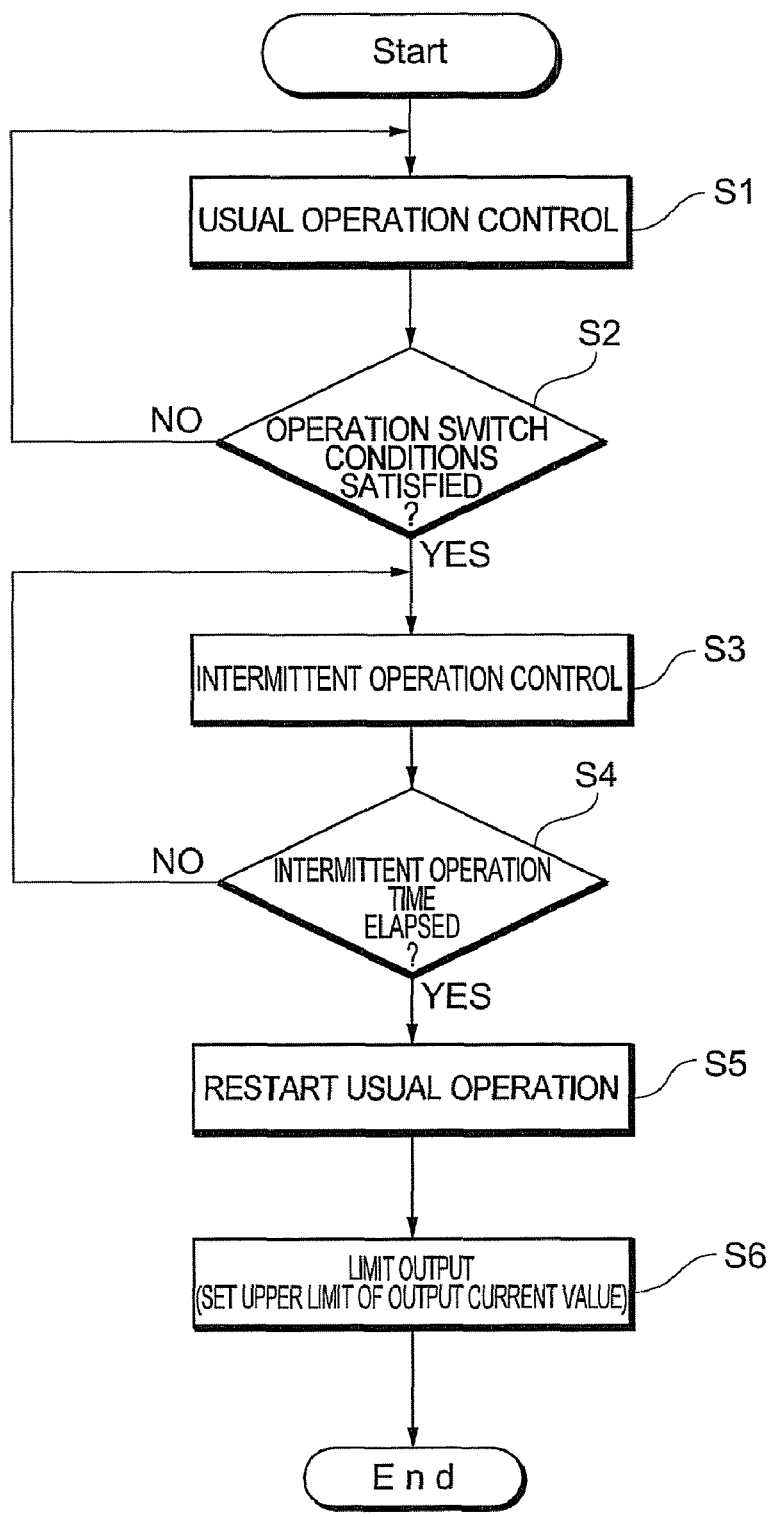
FIG. 2 is a flow chart for explaining a control method of the fuel cell system shown in FIG. 1.

1 . . . fuel cell system, 2 . . . fuel cell, 6 . . . control device (output limit means), and 41 . . . fuel supply source.

The invention claimed is:

1. A fuel cell system which comprises a fuel supply source and a fuel cell and which supplies a fuel gas from the fuel supply source via a fuel gas supply passage to the fuel cell to generate a power, the fuel cell system further comprising an output limit device that limits the output of the fuel cell after a shift from an intermittent operation mode of the fuel cell to a usual operation mode,
   wherein the output limit device subtracts the flow rate of the fuel gas used to recover the pressure of the fuel gas in the fuel gas supply passage in the intermittent operation mode to the pressure of the fuel gas in the usual operation mode from the total flow rate of the fuel gas supplied from the fuel supply source after the shift from the intermittent operation mode to the usual operation mode, to calculate the flow rate of the fuel gas actually supplied to the fuel cell after the shift from the intermittent operation mode to the usual operation mode, thereby limiting the output of the fuel cell by use of an output current value corresponding to the calculated flow rate as an upper limit.

2. A control method of a fuel cell system which comprises a fuel supply source and a fuel cell and which supplies a fuel gas from the fuel supply source via a fuel gas supply passage to the fuel cell to generate power and which limits the output of the fuel cell after a shift from an intermittent operation mode of the fuel cell to a usual operation mode thereof, the method comprising:
   a flow rate calculation step of subtracting the flow rate of the fuel gas used to recover the pressure of the fuel gas in the fuel gas supply passage in the intermittent operation mode to the pressure of the fuel gas in the usual operation mode from the total flow rate of the fuel gas supplied from the fuel supply source after the shift from the intermittent operation mode to the usual operation mode, to calculate the flow rate of the fuel gas actually supplied to the fuel cell after the shift from the intermittent operation mode to the usual operation mode; and
   an output limit step of limiting the output of the fuel cell by use of an output current value corresponding to the flow rate calculated in the flow rate calculation step as an upper limit.

* * * * *